United States Patent
Salter et al.

(10) Patent No.: US 10,144,337 B1
(45) Date of Patent: Dec. 4, 2018

(54) VEHICLE LIGHT ASSEMBLY

(71) Applicant: Ford Global Technologies, LLC, Dearborn, MI (US)

(72) Inventors: Stuart C. Salter, White Lake, MI (US); Pietro Buttolo, Dearborn Heights, MI (US); Annette Lynn Huebner, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/612,210

(22) Filed: Jun. 2, 2017

(51) Int. Cl.
| | |
|---|---|
| *B60Q 1/26* | (2006.01) |
| *B60Q 1/00* | (2006.01) |
| *B60Q 1/30* | (2006.01) |
| *B60Q 1/04* | (2006.01) |
| *F21V 23/04* | (2006.01) |
| *F21S 43/20* | (2018.01) |
| *F21V 3/12* | (2018.01) |
| *F21S 45/60* | (2018.01) |
| *B60Q 1/34* | (2006.01) |

(52) U.S. Cl.
CPC ......... *B60Q 1/0005* (2013.01); *B60Q 1/0023* (2013.01); *B60Q 1/04* (2013.01); *B60Q 1/30* (2013.01); *F21S 43/20* (2018.01); *F21S 45/60* (2018.01); *F21V 3/12* (2018.02); *F21V 23/0435* (2013.01); *F21V 23/0442* (2013.01); *F21V 23/0485* (2013.01); *B60Q 1/34* (2013.01); *B60Q 2400/30* (2013.01)

(58) Field of Classification Search
CPC .... B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60Q 2300/314; B60Q 1/1415; B60Q 2300/42; F21V 23/02; F21V 25/12; H05B 37/0236; A63J 17/00; F21L 14/026
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Minh D A

(74) *Attorney, Agent, or Firm* — Jason Rogers; Price Heneveld LLP

(57) ABSTRACT

A vehicle light assembly includes a light source. A lens is positioned proximate the light source. A conductive circuitry is disposed on the lens and forms a capacitive sensor. A temperature sensor is configured to detect a temperature of the light source.

19 Claims, 10 Drawing Sheets

(56) References Cited

U.S. PATENT DOCUMENTS

| | | |
|---|---|---|
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,547,119 B2 | 6/2009 | Kumana et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,193,301 B2 | 11/2015 | Salter et al. |
| 9,299,887 B2 | 3/2016 | Lowenthal et al. |
| 9,315,148 B2 | 4/2016 | Schwenke et al. |
| 9,421,902 B2 | 8/2016 | Kowatzki |
| 9,568,659 B2 | 2/2017 | Verger et al. |
| 9,616,812 B2 | 4/2017 | Sawayanagi |
| 9,646,436 B1 * | 5/2017 | Campbell ............ G07C 9/00111 |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2005/0265037 A1 * | 12/2005 | Newton ............... B60Q 1/2665 |
| | | 362/494 |
| 2006/0087826 A1 | 4/2006 | Anderson, Jr. |
| 2006/0097121 A1 | 5/2006 | Fugate |
| 2006/0198155 A1 | 9/2006 | Nickola et al. |
| 2007/0032319 A1 | 2/2007 | Tufte |
| 2007/0181565 A1 * | 8/2007 | Murahashi ........... B60Q 1/0005 |
| | | 219/629 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0113397 A1 * | 5/2013 | Salter ..................... F21V 23/04 |
| | | 315/362 |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102004029629 | 1/2006 |
| EP | 1793261 A1 | 6/2007 |
| EP | 2778209 A1 | 9/2014 |
| EP | 3002736 | 4/2016 |
| JP | 2000159011 A | 6/2000 |
| JP | 2007238063 A | 9/2007 |
| KR | 20060026531 A | 3/2006 |
| KR | 101648111 | 8/2016 |
| WO | 2006047306 A1 | 5/2006 |

(56) References Cited

FOREIGN PATENT DOCUMENTS

| WO | 200693464 | | 9/2006 |
|----|-----------|---|--------|
| WO | 2014068440 | A1 | 5/2014 |
| WO | 2014161927 | A1 | 10/2014 |

\* cited by examiner

VEHICLE LIGHT ASSEMBLY

FIELD OF THE INVENTION

The present disclosure generally relates to vehicles, and more particularly, to vehicle light assemblies.

BACKGROUND OF THE INVENTION

Automotive vehicles are commonly equipped with various exterior lighting assemblies including vehicle headlights at the front of the vehicle and taillights at the rear of the vehicle. Vehicle exterior lighting assemblies typically include a light source disposed within a housing having an outer lens. Some assemblies experience moisture buildup on the inside of the lens. In addition, moisture in the form of snow and ice may accumulate on the outside of the lens in cold weather conditions.

SUMMARY OF THE INVENTION

According to one aspect of the present disclosure, a vehicle light assembly includes a light source. A lens is positioned proximate the light source. A conductive circuitry is disposed on the lens and forms a capacitive sensor. A temperature sensor is configured to detect a temperature of the light source.

According to another aspect of the present disclosure, a vehicle includes a vehicle light assembly including a light source. A lens is positioned proximate the light source. A conductive circuitry is disposed on the lens and forms a capacitive sensor. One or more wireless communication transceivers is configured to detect an electronic device proximate the light assembly.

According to yet another aspect of the present disclosure, a method of illuminating a vehicle light assembly, comprising: illuminating a light source at a first illumination, detecting a capacitive signal proximate the light source and illuminating the light source at a second illumination in response to the detection of the capacitive field.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
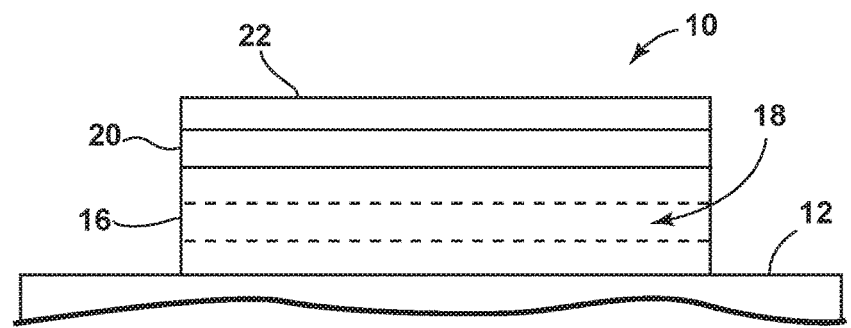
FIG. 1A is a side view of a photoluminescent structure rendered as a coating for use in an assembly according to one embodiment.
Figure 1B:
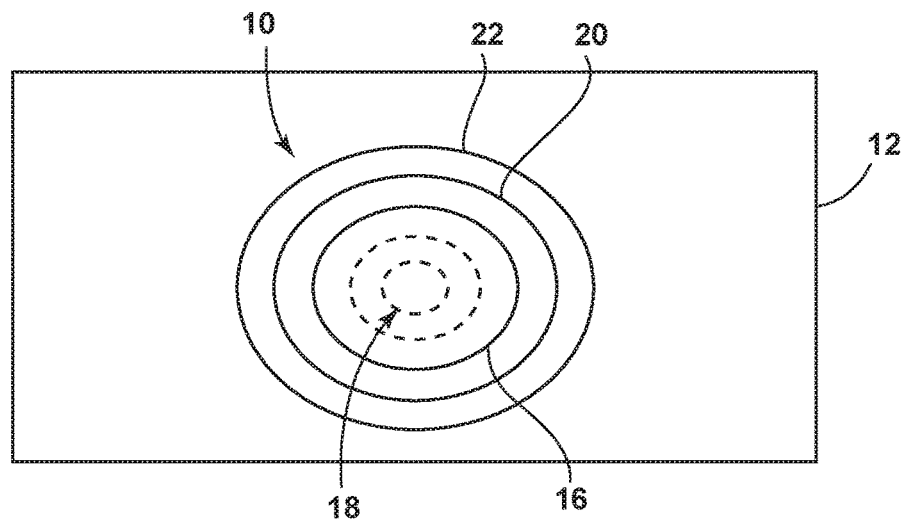
FIG. 1B is a top view of a photoluminescent structure rendered as a discrete particle according to one embodiment.
Figure 1C:
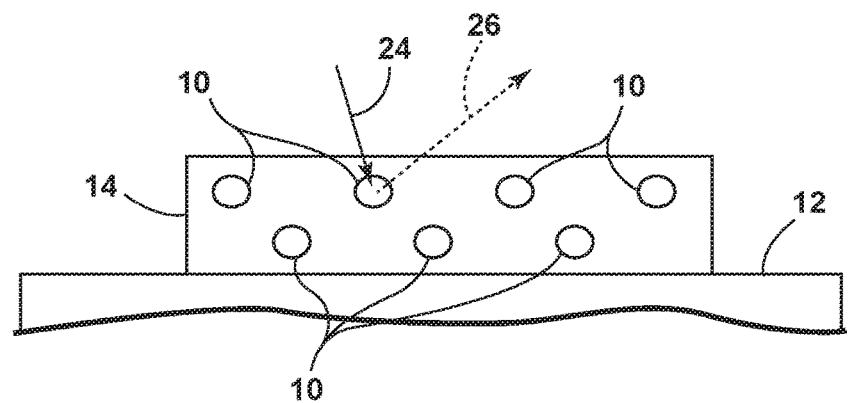
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Agrawal et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emit the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2A:
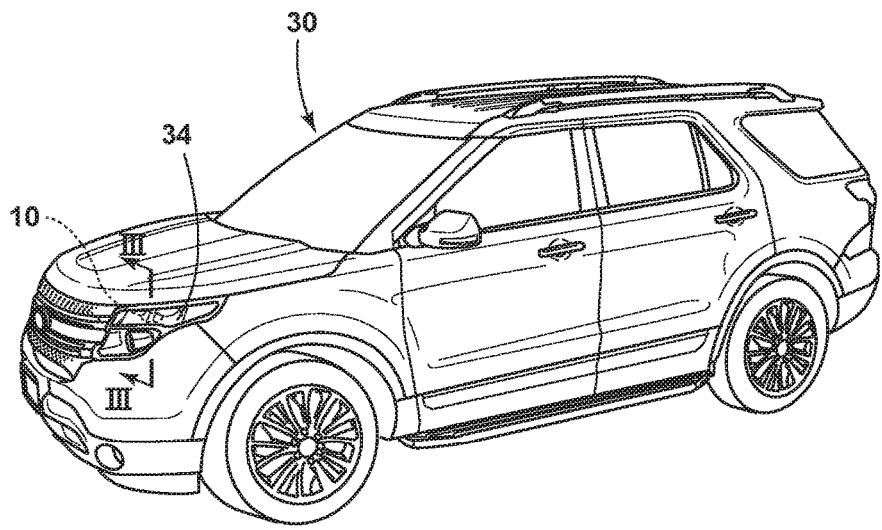
FIG. 2A is a front perspective view of a vehicle, according to at least one example.
Figure 2B:
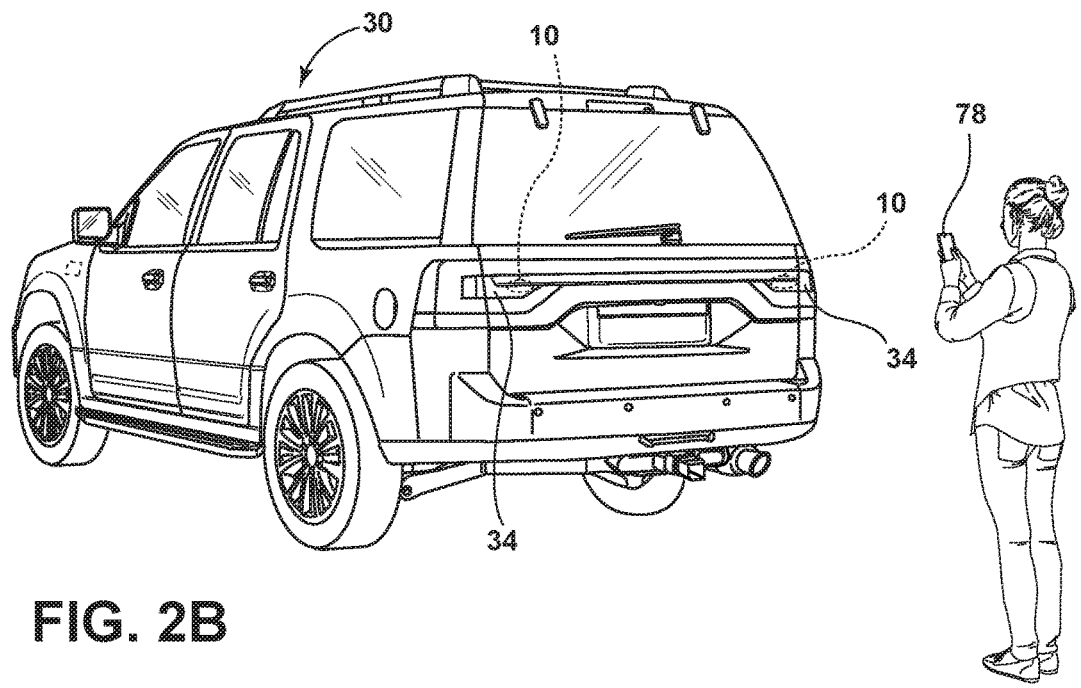
FIG. 2B is a rear perspective view of the vehicle of FIG. 2A, according to at least one example.

Referring now to FIGS. 2A and 2B, a vehicle 30 is generally depicted. The vehicle 30 is depicted as a sports-utility vehicle, but it will be understood that the vehicle 30 may be a pickup truck, sedan, compact and/or other types of vehicles 30 without departing from the teachings provided herein. The vehicle 30 is shown having a plurality of light assemblies 34 positioned around the vehicle 30. For example, the light assemblies 34 may be headlights (e.g., FIG. 2A), taillights (e.g., FIG. 2B) and/or a variety of light assemblies 34 positioned around the vehicle 30 (e.g., running lights, reverse lights, brake lights, turn indicators, center high mount stop lamp, running board lights, etc.). In headlight examples of the light assemblies 34, the light assemblies 34 are configured to provide headlight illumination forward of the vehicle 30. In taillight examples, the light assemblies 34 are configured to provide taillight illumination generally rearward of the vehicle 30. One or more of the light assemblies 34 may be configured to include conductive circuitry that provides moisture sensing and removal of the moisture from the respective lighting assemblies 34. As will be explained in greater detail below, the conductive circuitry may also serve as a proximity sensor to detect the presence of a user or a touch by the user of the light assembly 34.

Figure 3:
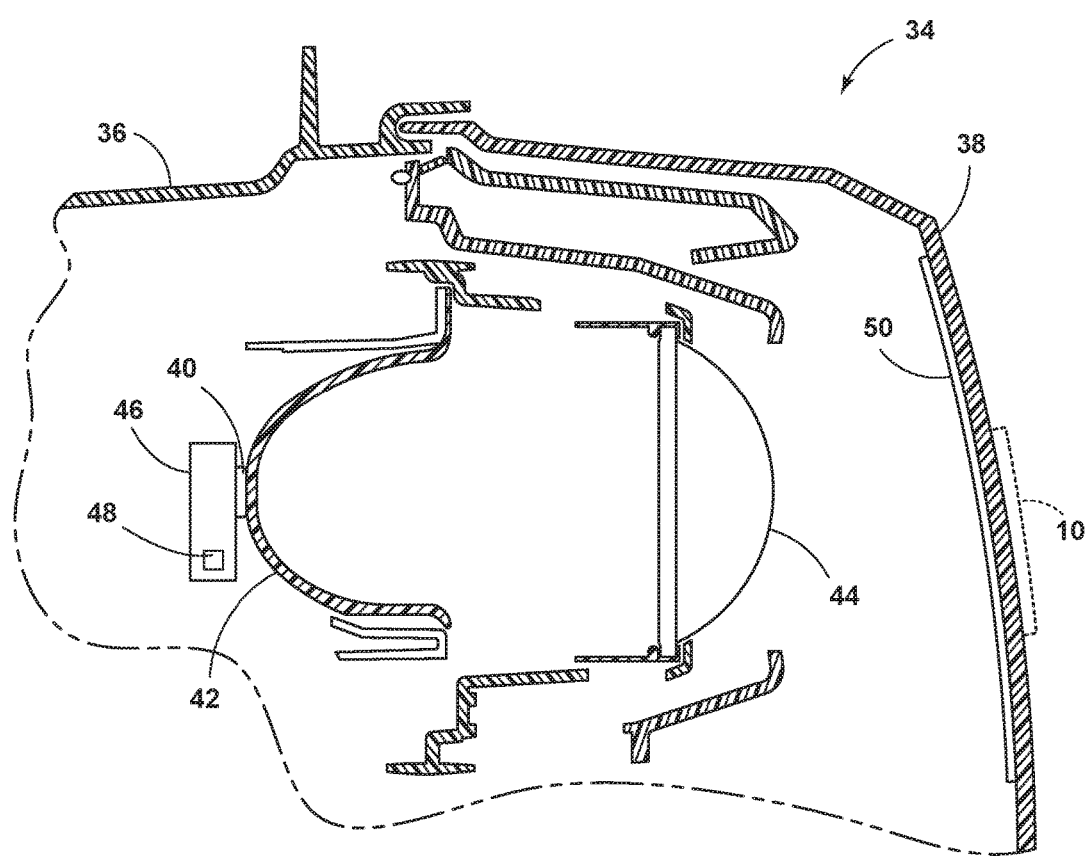
FIG. 3 is a cross-sectional view of one of a light assembly taken through line III-III of FIG. 2A, according to at least one example.
Figure 4:
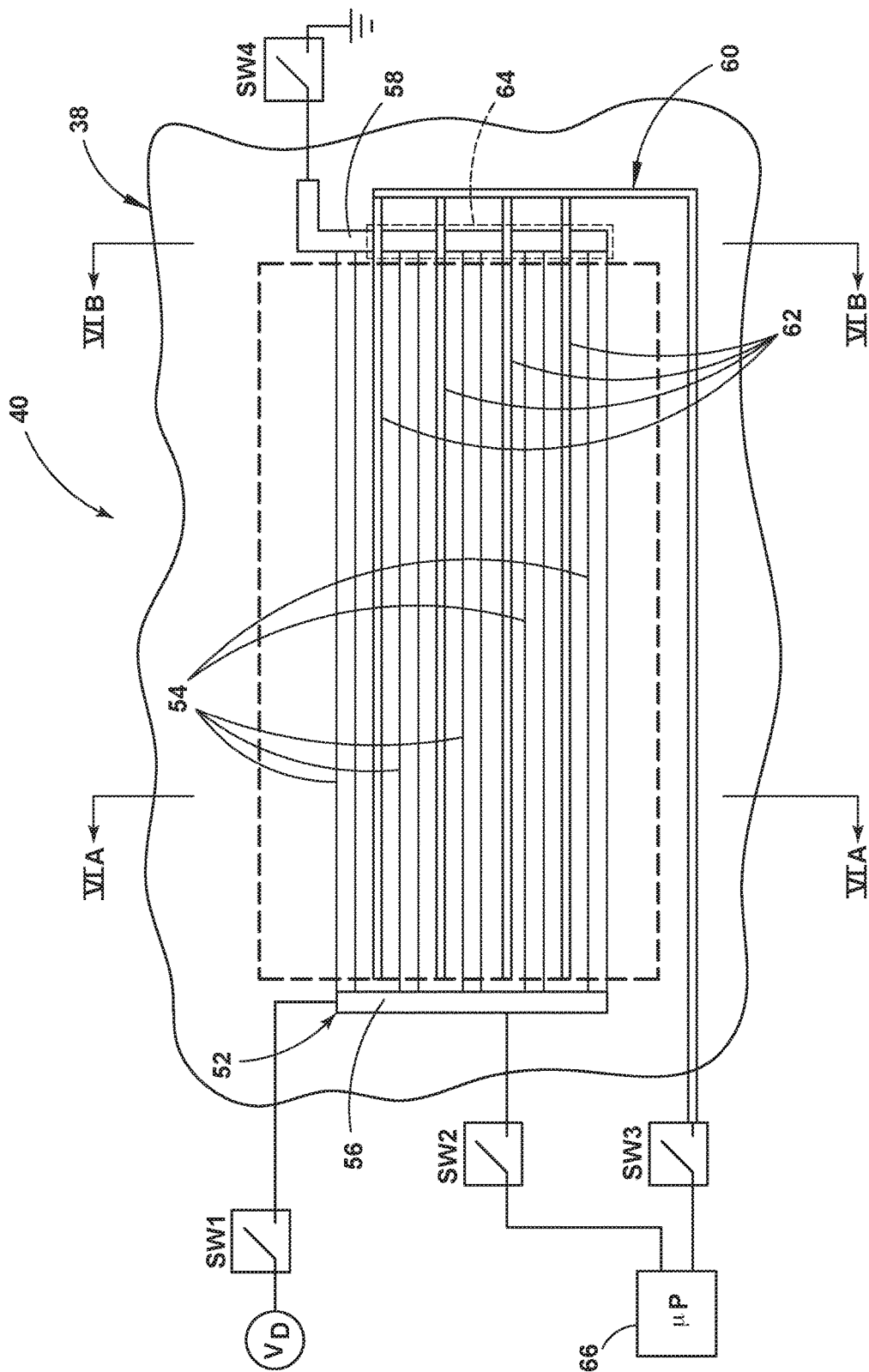
FIG. 4 is a schematic diagram of conductive circuitry formed on the lens, according to at least one example.

Referring to FIG. 3, the light assembly 34 is shown having a housing 36 and an outer lens 38 connected to housing 36. Housing 36 is generally fixed to the vehicle body in a conventional manner. Disposed within the housing 36 and outer lens 38 is a light source 40, a reflector 42, and an inner lens 44. The light source 40 may include one or more light emitting diodes (LEDs), incandescent bulbs, halogen bulbs, or other sources of light illumination. In LED examples of the light source 40, the light source 40 may be positioned on a printed circuit board 46. The printed circuit board (PCB) 46 may incorporate one or more temperature sensors 48. The temperature sensor 48 may be a standalone device coupled to the PCB 46, or may be part of an existing component (e.g., the built-in temperature sensor 48 may be built into a microprocessor on the PCB 46). As will be explained in greater detail below, the temperature sensor 48 may be configured to generally detect a temperature of the PCB 46, the light source 40, the light assembly 34, and/or other components within and proximate the light assembly 34.

The reflector 42 is generally positioned to reflect light output from the light source 40 forward of the vehicle 30 through the inner lens 44 and outer lens 38 to illuminate a roadway generally forward of the vehicle 30. The inner lens 44 and outer lens 38 may be made of a clear light transmissive polymeric material, glass material and/or combinations thereof. In the depicted example, the light assembly 34 is configured as a headlight configured as a low beam light assembly, a high beam light assembly, and/or a combination of low and high light beam assemblies. Additionally, the housing 36 and outer lens 38 may contain a plurality of light sources for multiple functions, such as headlight illumination, daylight running lamps, turn signals, flashers, and other lighting functions. It will be understood that although depicted as an exterior light, the light assembly 34 may be an interior light assembly 34 such as a map light, dome light, puddle light, trunk light and/or other light assemblies 34 positioned within an interior of the vehicle 30.

The vehicle light assembly 34 includes conductive circuitry 50 provided on the outer lens 38 for providing a capacitive sensor for moisture sensing and a heater for heating or defrost operations. The conductive circuitry 50 forms both a capacitive sensor for sensing moisture on the lens and a heater for removing the moisture. In the depicted example, the conductive circuitry 50 is formed on the inside surface of the outer lens 38, but it will be understood that the conductive circuitry 50 may otherwise be formed on the outside surface of the outer lens 38 and/or in an intermediate layer of the outer lens 38.

The photoluminescent structure 10 may be positioned on an interior and/or an exterior surface of the outer lens 38. The photoluminescent structure 10 may be configured as an indicia such as alphanumeric text, numbers, symbols and/or pictures. As will be explained in greater detail below, the light source 40 may be configured to emit the excitation light to excite the photoluminescent structure 10.

Referring now to FIGS. 4-6B, the conductive circuitry 50 includes control circuitry for controlling the conductive circuitry 50. The conductive circuitry 50 is made up of an electrically conductive material that allows electrical current and signals to be transmitted thereon. The conductive circuitry 50 includes a first electrode 52 having a first plurality of electrode fingers 54 shown extending between conductive lines 56 and 58. The conductive circuitry 50 also includes a second electrode 60 having a second plurality of electrode fingers 62 that are electrically isolated or dielectrically isolated from the first plurality of electrode fingers 54. The first and second plurality of electrode fingers 54 and 62 are interdigitated so as to form a capacitive coupling therebetween when configured as a capacitive sensor. A dielectric layer 64 is disposed between electrode fingers 62 and connecting line 58 to allow the signal lines to cross over without making electrical connections. As such, the second electrode 60 and corresponding electrode fingers 62 are dielectrically isolated from connecting line 58 and the first electrode 52 and corresponding electrode fingers 54.

Switching circuitry including a plurality of switches, shown as first switch SW1, second switch SW2, third switch SW3, and fourth switch SW4 are illustrated connected to the conductive circuitry 50 to control switching of the conductive circuitry 50 between the capacitive sensor and heater operations. Each of the switches SW1-SW4 may be controlled by control circuitry including a microprocessor 66 as shown. The first switch SW1 connects the first electrode 52 via connecting line 56 to a defrost voltage source shown as $V_D$. The fourth switch SW4 is shown connecting the first electrode 52 via the connecting line 58 to ground. As such, when the first switch SW1 and fourth switch SW4 are in the closed positions for the heater operation, a defroster voltage $V_O$ is applied across the first electrode 52 from the first connecting line 56 across fingers 54 to the second connecting line 58 and to ground to cause electric current to flow therethrough and generate heat across the first electrode 52 to operate as a heater to defrost or defog the outer lens 38. At the same time, switches SW2 and SW3 are in the open position during the heater/defogger or defrost operation. It will be understood that electrical current passing through the first electrode 52 generates heat due to the electrical resistance of the circuit which forms a resistive heater for removing moisture from the outer lens 38. Moisture may be in the form of humidity which is water vapor in the air, or may be in the form of condensation which is water on a surface which can be in the form of liquid water or frozen water (e.g., ice or frost).

The conductive circuitry 50 may also be configured to operate in a sensing operation as a capacitive sensor to sense moisture on the outer lens 38 such as condensation on the inside or outside of the outer lens 38 or snow or ice on the outside of the outer lens 38. Further, the conductive circuitry, when operating as the capacitive sensor, may be configured to detect a disturbance (e.g., a finger or other vehicle user's touch on or proximate the light assembly 34) in an activation field emitted, or created, by the conductive circuitry 50. When moisture is sensed on the outer lens 38 (e.g., while the conductive circuitry 50 is operating as the capacitive sensor), the conductive circuitry 50 may be switched to the heater configuration to remove the sensed moisture. In order to operate as a capacitive sensor, the conductive circuitry 50 is controlled by opening the first switch SW1 and the fourth switch SW4 and closing the second switch SW2 and the third switch SW3. With the first and fourth switches SW1 and SW4 open, electrical power from the defrost voltage is removed and with the second and third switches SW2 and SW3 closed, the microprocessor 66 is able to control drive and receive signals to and from the first and second electrodes 52 and 60 so as to generate a capacitive activation field for sensing moisture on the outer lens 38. The capacitive sensor is configured to sense moisture, such as condensation on the interior surface of the outer lens 38 and humidity proximate to the interior surface of the lens 38 and water vapor on the outside of the lens 38 such as in the form of liquid or ice. The moisture is sensed by a change in the signal generated by the proximity sensor due to the moisture content in the air on the surface of the outer lens 38. When moisture is detected, the conductive circuitry may be switched to the heater operation to remove the moisture. It should be appreciated that the housing 36 or lens 38 may have a moisture outlet such as a GoreTex® patch to allow heated moisture to exit the interior.

The capacitive sensor employs the first electrode 52 as a drive electrode and the second electrode 60 as a receive electrode, each having interdigitated fingers 54 and 62, respectively, for generating a capacitive field. According to various examples, the first electrode 52 receives square wave drive signal pulses applied at a voltage. The second electrode 60 has an output for generating an output voltage. It should be appreciated that the first and second electrodes 52 and 60 and corresponding electrode fingers 54 and 62 may be arranged in various configurations for generating the capacitive fields as the sense activation fields, according to various examples. It should also be appreciated that the first and second electrodes 52 and 60 may otherwise be configured so that other types of single electrode sensors or other multiple electrode sensors may be used. The conductive circuitry 50 may be formed with conductive ink or may be alternatively formed with rigid or flexible circuitry that may be adhered or otherwise attached to the outer lens 38.

According to various examples, the first electrode 52 is supplied with an input voltage as square wave signal pulses having a charge pulse cycle sufficient to charge the second electrode 60 to a desired voltage. The second electrode 60 thereby serves as a measurement electrode. When moisture, such as humidity or condensation on the interior or exterior surface of the outer lens 38 is detected, the moisture causes a disturbance in the activation field which generates a signal that is processed to determine the moisture level. The disturbance of the activation field is detected by processing the charge pulse signals.

The conductive circuitry 50 may be formed with a film of indium tin oxide (ITO). According to various examples, the ITO forming the conductive circuitry 50 may be formed as an ink printed onto the interior surface of the outer lens 38. The ITO may be deposited as a thin film onto the surface of the outer lens 38 and may have a thickness of about 1,000-3,000 angstroms to form a transparent electrical conductor. The ITO layer forming the conductive circuitry 50 is a substantially visually transparent medium that can be used to form the first and second electrodes 52 and 60 and other conductive signal lines for forming the proximity sensors and the heating elements. As such, the conductive circuitry 50 will remain substantially invisible to a user looking through the outer lens 38. In other examples, other transparent and semi-transparent or visible conductive inks or films may be used to form the conductive circuitry 50.

Figure 5:
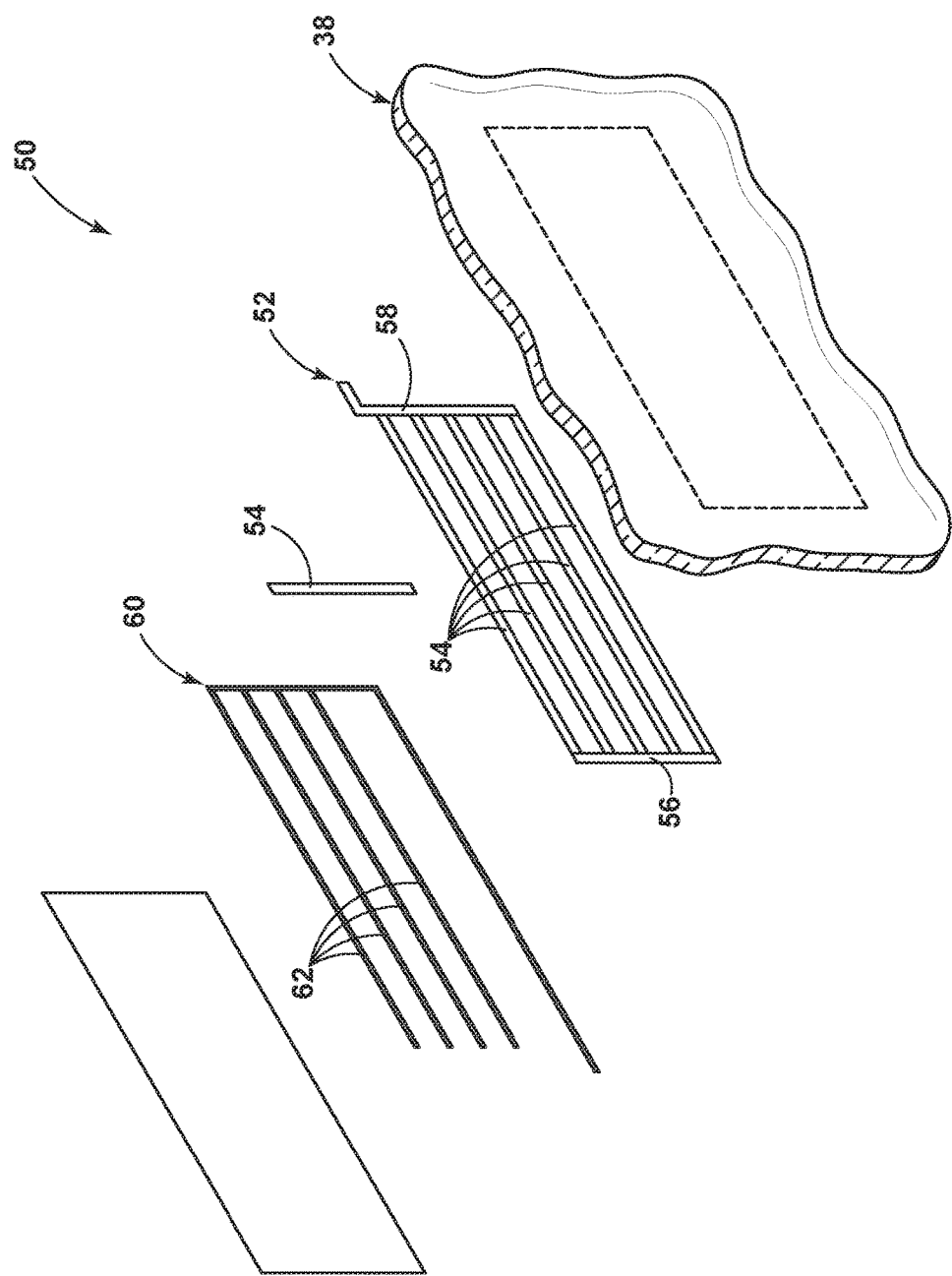
FIG. 5 is an exploded view of the conductive circuitry shown in FIG. 4, according to at least one example.
Figure 6A:
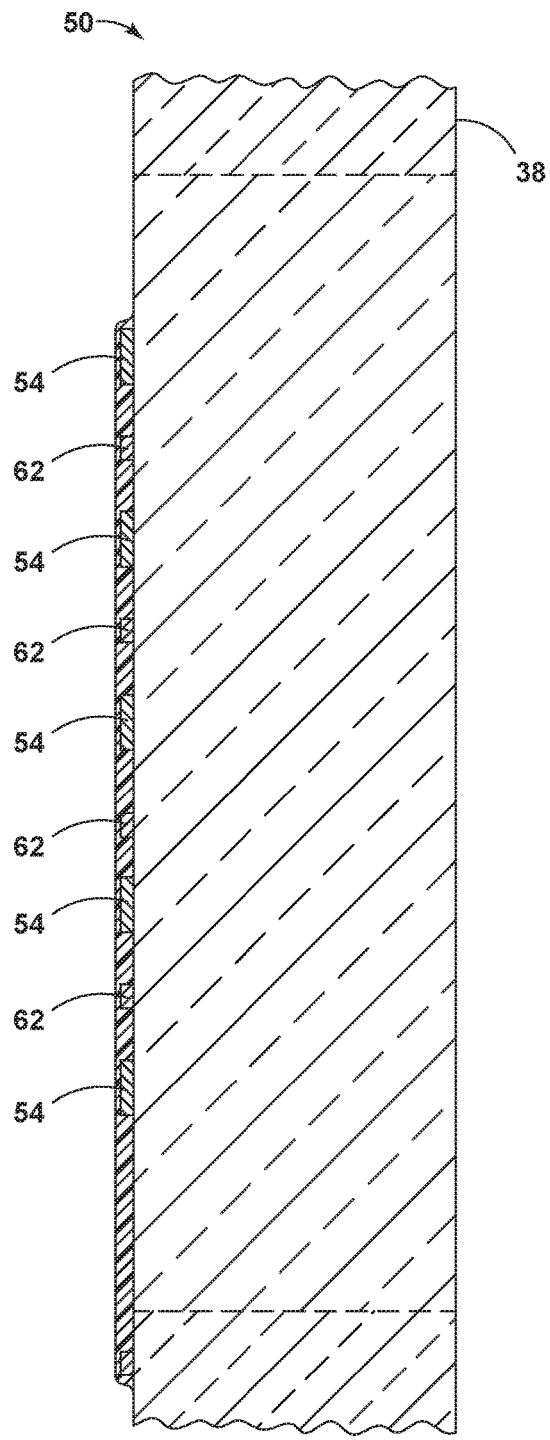
FIG. 6A is a cross-sectional view taken through line VIA-VIA of FIG. 4, according to at least one example.
Figure 6B:
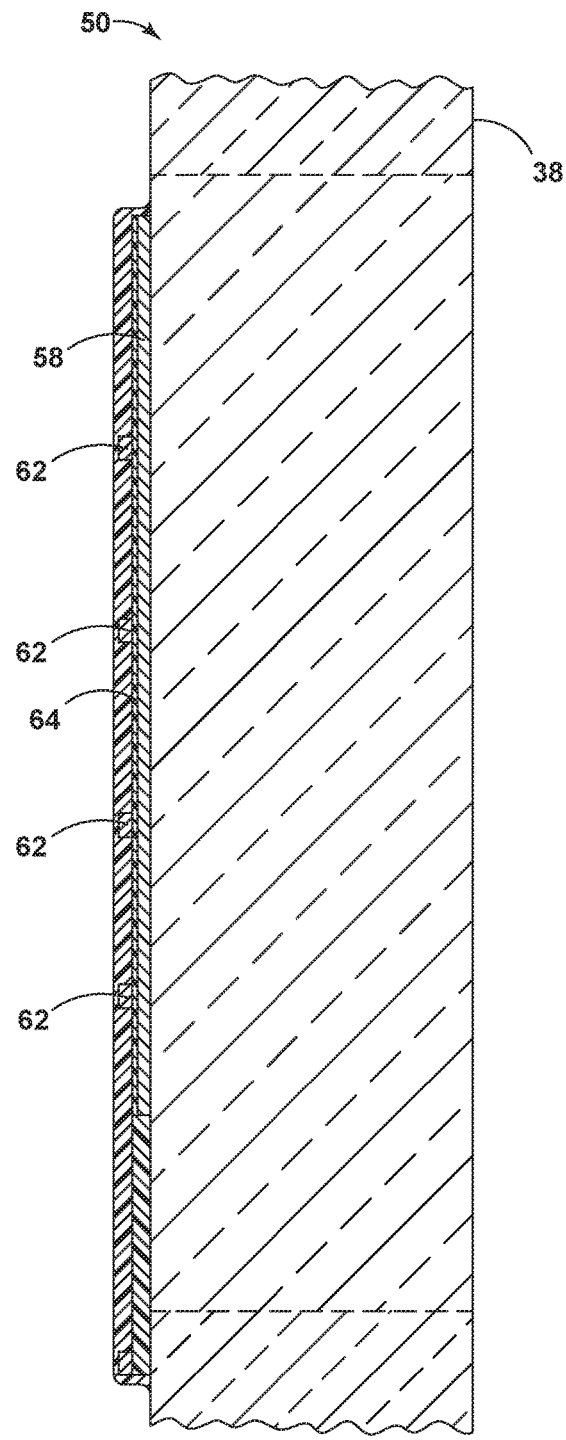
FIG. 6B is a cross-sectional view taken through line VIB-VIB of FIG. 4, according to at least one example.

Referring now to FIGS. 5-6B, the first and second electrodes 52 and 60 and corresponding first and second plurality of conductive fingers 54 and 62, respectively, may be formed on the inside surface of the outer lens 38. The first electrode 52 may be disposed on or adhered via an adhesive onto the inner surface of outer lens 38. The second electrode 60 is also disposed onto the inner surface of outer lens 38 such that the second plurality of fingers 62 is interdigitated with the first plurality of fingers 54. In order to prevent short circuiting of the first and second electrodes 52 and 60, the dielectric layer 64 may be disposed between the first and second electrodes 52 and 60 on the inner surface of connecting line 58 such that the second electrode 60 and second plurality of conductive fingers 62 are separated from the first electrode 52 at that location as shown in FIG. 6B. The remainder of the first and second electrodes 52 and 60 and conductive fingers 54 and 62 may be substantially coplanar on the inner surface of the outer lens 38 as depicted in FIG. 6A. It will be understood that the dielectric layer 64 may be enlarged to cover substantially more or all of the surface area between the first and second electrodes.

Figure 7:
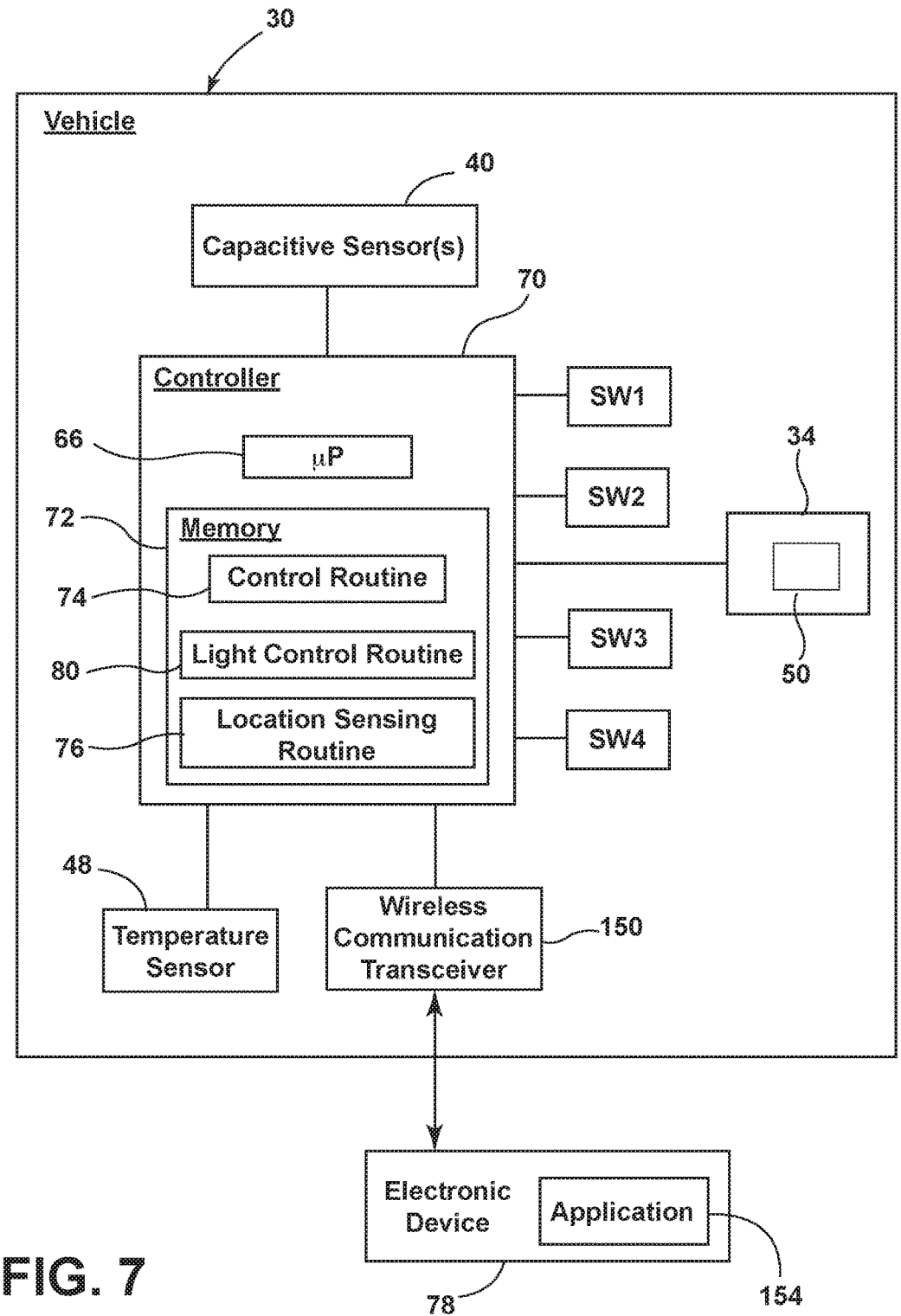
FIG. 7 is a block diagram illustrating controls for controlling the switching of the conductive circuitry, according to at least one example.

Referring to FIG. 7, the conductive circuitry 50 is illustrated controlled by a controller 70. The signals generated by the capacitive sensor input to the controller 70. The controller 70 may include circuitry, such as the microprocessor 66 and a memory 72. The control circuitry may include sense control circuitry for processing the activation field of the capacitive sensor to sense moisture proximate to the outer lens 38 and/or touching of the light assembly 34. It will be understood that other analog and/or digital control circuitry may be employed to process the capacitive field signals to determine the presence of moisture buildup on the outer lens 38 and initiate defogging or moisture removal with activation of the heater operation as well as aid in the detection of touching of the light assembly 34 without departing from the teachings provided herein.

The controller 70 may include an analog-to-digital (A/D) comparator integrated within or coupled to the microprocessor 66 and may receive voltage output from the capacitive sensor, convert the analog signal to a digital signal, and provide a digital signal to the microprocessor 66. The controller 70 may include a pulse counter integrated within or coupled to the microprocessor 66 that counts the charge signal pulses that are applied to the drive electrode, performs a count of the pulses needed to charge the capacitor until the voltage output reaches a predetermined voltage, and provides the count to the microprocessor 66. The pulse count is indicative of the change in capacitance of the capacitive signal. The controller 70 may provide a pulse width modulated signal to a pulse width modulated drive buffer to generate the square wave pulse which is applied to the drive electrode. The controller 70 may determine the moisture present at or proximate to the outer lens 38 and control the heater by controlling the switches SW1-SW4 as outputs. As will be explained in greater detail below, the controller 70 may also regulate the electrical current applied to the light source 40 in response to activation of the capacitive sensor. For example, the memory 72 may include a control routine 74 for controlling the switches to switch operation of the conductive circuitry 50 between the capacitive sensing operation mode and the heater operation mode, a location sensing routine 76 for determining the location of an electronic device 78 proximate the vehicle 30, and a light control routine 80 for adjusting the intensity of light provided by the light source 40 based on a number of factors. The electronic device 78 may include a cellphone, a key FOB, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic).

Figure 8:
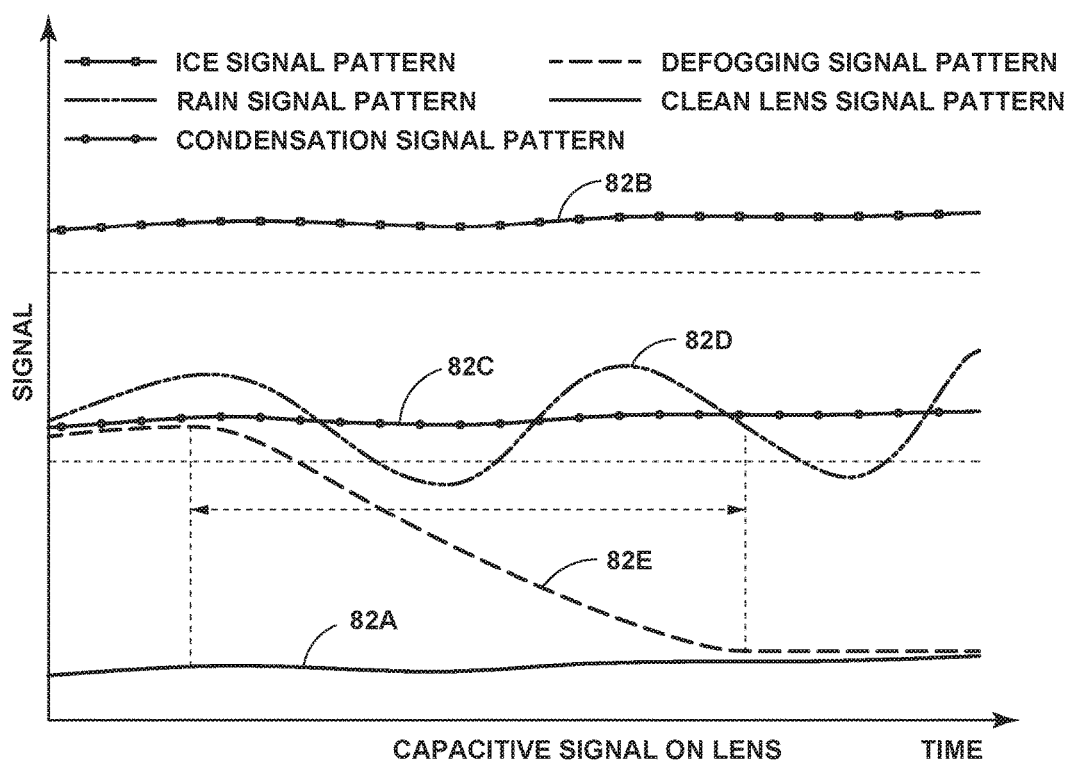
FIG. 8 is a graph illustrating signals generated by the capacitive sensor indicative of moisture on the lens.

Referring to FIG. 8, the change in signal charge pulse counts detected during various moisture conditions is shown as signals 82A-82E. The change in signal 82A-82E is a count value difference between an initialized reference count value for different levels of moisture present on the outer lens 38. As moisture in the form of condensation on the outer lens 38 or humidity proximate thereto increases, the moisture enters the activation field associated with the capacitive sensor and causes a disruption to the capacitance, thereby resulting in a raw signal increase as shown by signals 82B-82E. Signal 82A represents a clean lens having little or no moisture in which the signal 82A is relatively low and steady. Signal 82B shows the signal when sensing ice on the outside surface of the outer lens 38 which has a relatively high signal output. Signal 82C shows the results of condensation formed on the outer lens 38. Signal 82D shows the effect of rain on the outer surface of the outer lens 38. Signal 82E shows a defogging signal pattern that shows the removal of moisture during the heater operation. By monitoring the signal generated by the capacitive sensor and comparing the signal to known moisture values, the condensation or humidity can be sensed and used to control the heater to remove the condensation from the outer lens 38.

Figure 9:
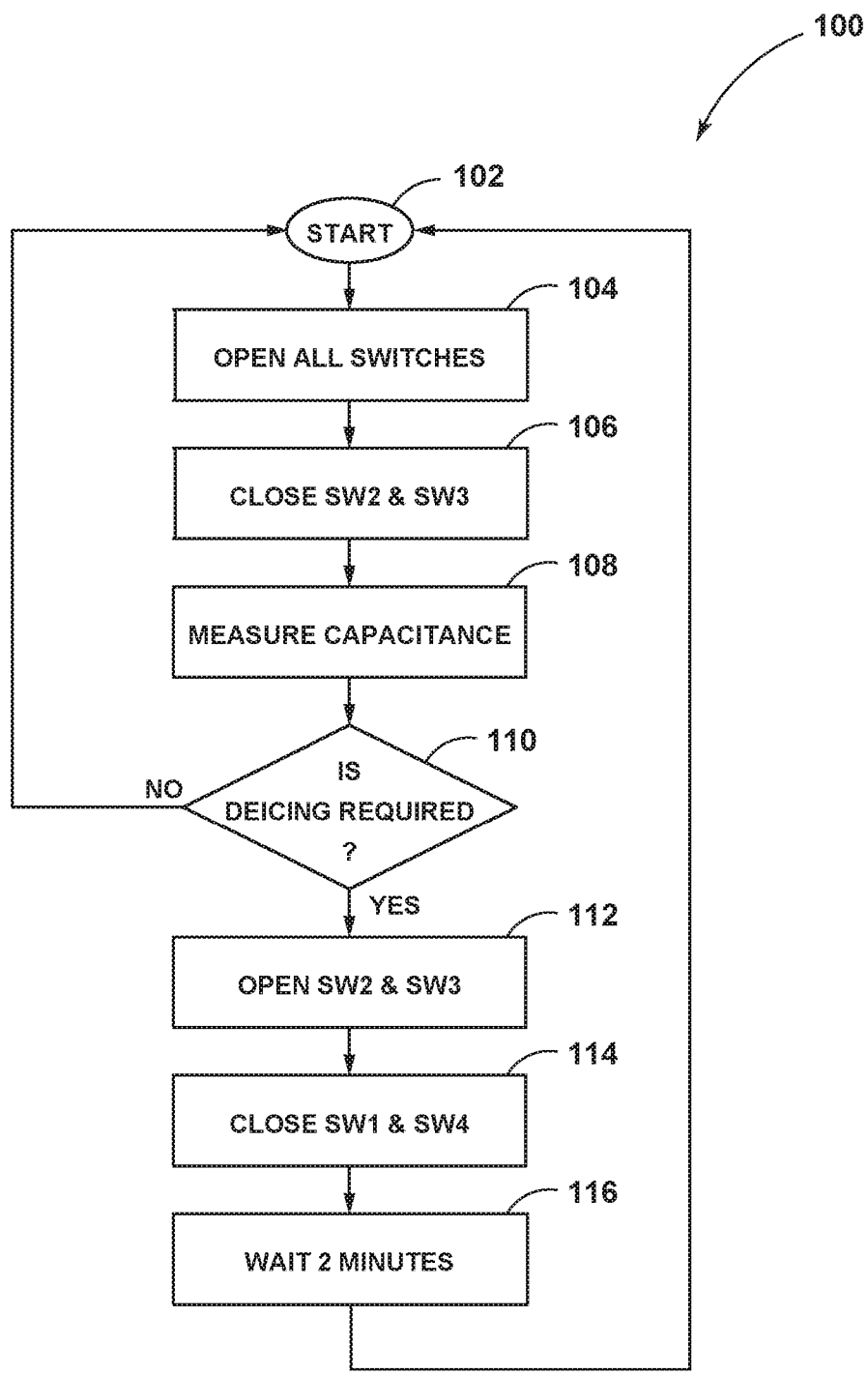
FIG. 9 is a flow diagram illustrating a control routine for controlling the switching between the capacitive sensor and heater, according to at least one example.

Referring to FIG. 9, routine 100 is illustrated for controlling the switches to switch operation of the conductive circuitry 50 between the capacitive sensing operation mode and the heater operation mode. Routine 74 begins at step 102 and proceeds to step 104 to open all switches SW1-SW4. Next, at step 106, the second and third switches SW2 and SW3 are closed. This places the conductive circuitry 50 into the capacitive sensor mode of operation. The capacitance is then measured at step 108. Proceeding to step 110, routine 100 determines if de-icing is required based on the measured capacitance indicating that moisture has built up on the outer lens. De-icing may be required when there is sufficient condensation on the inside or outside of the lens or snow or ice on the outside of the lens. If de-icing is not required, routine 74 returns to step 102. If de-icing is required, routine 100 proceeds to step 112 to open the second and third switches SW2 and SW3 and then to step 114 to close the first and fourth switches SW1 and SW4. This places the conductive circuitry 50 into the heater mode of operation. At this point, the heater operates to heat the outer lens 38 to remove some or all of the moisture from the outer lens 38. Routine 100 proceeds to step 116 to wait for a time period (e.g., one minute, two minutes, etc.) to operate the heater before returning to step 102. It will be appreciated that routine 100 may be repeated to cycle the conductive circuitry 50 between the capacitive sensing and heater modes of operation a predetermined number of times or if moisture is sensed again as present on the outer lens 38.

Referring again to FIG. 7 the vehicle 30 is also equipped with one or more sensors for detecting if a person and the electronic device 78 (FIG. 2B) are near or proximate the vehicle 30. The sensors may include wireless communication transceivers 150. The vehicle 30 and/or light assembly 34 may include one or a plurality of wireless communication transceivers 150 and be configured to interact with the electronic device 78. The wireless communication transceivers 150 may communicate with the electronic device 78 over a wireless signal (e.g., radio frequency). In a specific example, the wireless communication transceivers 150 may be a Bluetooth™ RN4020 module, or an RN4020 Bluetooth™ low energy PICtail board configured to communicate with the electronic device 78 using Bluetooth™ low energy signals. The wireless communication transceivers 150 may include a transmitter and a receiver to transmit and receive wireless signals (e.g., Bluetooth™ signals) to and from the electronic device 78. It will be appreciated that the wireless communication transceivers 150 may utilize other forms of wireless communication between with the electronic device 78 and other wireless communication transceivers 150 such as Wi-Fi™ without departing from the teachings provided herein. The wireless communication transceivers 150 may be positioned on or within the controller 70. The wireless communication transceiver 150 is configured to communicate with the microprocessor 66 such that one or more of the routines stored in the memory 72 is activated. The electronic device 78 may include one or more routines which control the communication between the wireless communication transceiver 150 and the electronic device 78. For example, in mobile smart phone examples of the electronic device 78, the phone may include one or more applications 154 configured to communicate with the wireless communication transceivers 150. In various examples, the wireless communication transceivers 150 are standalone devices that are not in communication with body control modules, electronic control modules, engine control modules and/or other features of the vehicle 30. For example, the wireless communication transceivers 150 may only be capable of communication with the controller 70 and the electronic device 78. In other examples, the wireless communication transceivers 150 may communicate with the body controller or other onboard controllers.

In examples utilizing multiple wireless communication transceivers 150, the transceivers 150 may be in communication with one another or may mutually communicate with a master controller or module (e.g., body control module). The wireless communication transceivers 150 may be disposed within other accessories of the vehicle 30, or may be standalone units. The electronic device 78 may communicate with all, some, or none of the wireless communication transceivers 150 as the electronic device 78 enters and exits the communication range of the transceivers 150. Each of the wireless communication transceivers 150 may be aware of its location within the vehicle 30 and capable of sharing its location with the electronic device 78. In various examples, the wireless communication transceivers 150 are capable of communicating with the electronic device 78 such that the location of the electronic device 78 may be determined therefrom (e.g., based on signal strength and/or return time of the signal) or vice versa. According to various examples, the location sensing routine 76 in the memory 72 of the controller 70 may utilize the signal strength and time to return of the signals between the wireless communication transceivers 150 and the electronic device 78 to triangulate the position of the electronic device 78 as the person moves around and inside of the vehicle 30. In examples where the wireless communication transceivers 150 communicate with a master module, the location of the electronic device 78 may be calculated in the master module. The location of the electronic device 78 may have sufficient resolution to determine which seat within the vehicle 30 the user is approaching or sitting in. The electronic device 78 may then share its determined location with the wireless communication transceivers 150 such that appropriate features may be activated by the appropriate transceivers 150. It will be understood that the location sensing routine 76 may be located on the electronic device 78 and that any location determinations may be made by the electronic device 78 and shared with the wireless communication transceivers 150 without departing from the teachings provided herein.

Choosing which electronic devices 78 should be trusted, and, therefore, given access to command of the controller 70, may be determined based on whether the electronic device 78 has been inside of the vehicle 30 before. Memory within the wireless communication transceivers 150 may store identifying information relating to electronic devices 78 which were detected within the vehicle 30 (e.g., using the location sensing routine 76) and which may therefore be generally regarded as "friendly," registered and/or as the owner of the vehicle 30. In an exemplary method of determining that an unknown electronic device 78 is friendly, the wireless communication transceivers 150 detect the presence of an unknown electronic device 78, detect a characteristic signal shift (e.g., attenuation or increase in signal at corresponding wireless communication transceivers 150) indicative of the unknown electronic device 78 entering or being within the vehicle 30 across multiple wireless communication transceivers 150, and store characteristic information about the electronic device 78 for future identification. It will be understood that a determination of the location of the electronic device 78 to be within the vehicle 30 may also prompt a storing of the characteristic information about the electronic device 78 for future identification. Utilizing the past and/or present location of the electronic device 78 as a security feature to determine if it is allowed access to the controller 70 may be particularly advantageous as the replication of signal shifting indicative of the electronic device 78 entering the vehicle 30 and the location of the electronic device 78 is particularly difficult to fake. Further, it will be understood that more conventional methods of connecting electronic devices 78, such as pairing and manually connecting, may also be utilized to designate friendly devices 78.

Figure 10:
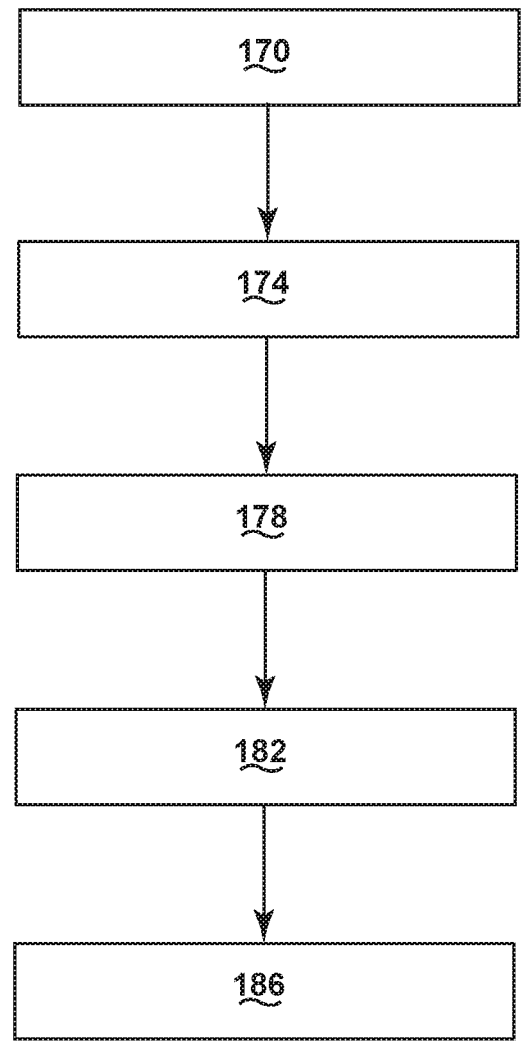
FIG. 10 is a flow diagram illustrating a light control routine for controlling the light assembly, according to at least one example.

The light control routine 80 may control the light assembly 34 in a variety of manners depending on detected properties of the electronic device 78 (e.g., known or unknown device, location, and user specific data) and/or signals from the temperature sensor 48. For example, if a known or friendly electronic device 78 is detected near (e.g., within about 2 m) the rear of the vehicle 30 and the capacitive sensor detects a change in the activation field (i.e., indicative of a person in possession of the electronic device 78 touching or getting close to the light assembly 34), the light control routine 80 may be configured to alter an electrical current provided to the light source 40 to change intensity of illumination from the light source 40 (e.g., by overdriving the light source 40). For example, the light control routine 80 may begin with a step 170 (FIG. 10) of illuminating the light source 40 at a first illumination. The first illumination may be a standard illumination or the light source 40 may be off. Next, a step 174 of detecting a capacitive signal proximate the light source 40 is performed. The capacitive signal may be the detection of a change of the activation field by the capacitive sensor. As explained above, this capacitive signal may be the touch of a user of the light assembly 34. Next a step 178 of illuminating the light source 40 at a second illumination in response to the detection of the capacitive signal may be carried out. The second illumination may be higher or lower relative to the first illumination. In practice, the light control routine 80 may be advantageous in allowing the light of the light assembly 34 to be altered in real time by a person proximate the light assembly 34. For example, a person located proximate the light assembly 34 may touch the light assembly 34 in order to change (e.g., increase or decrease) the illumination of the light assembly 34. Such a feature may be advantageous in allowing the person to increase the illumination if they are working behind the vehicle 30 or to decrease the illumination if the lights are too bright. It will be understood that the person may touch the light assembly 34 multiple times to cycle though various illuminations provided by the light assembly 34. Further, the cycling of various illuminations may be carried out through use of the application 154 on the electronic device 78. Even further, each light assembly 34 may be individually controlled and/or touching one light assembly 34 may increase or decrease the illumination from all light assemblies 34. It will be understood that touching the light assembly 34 may further activate the light source 40 to emit excitation light 24 which excites the photoluminescent structure.

According to various examples, the light control routine 80 may only be activated while detection of a friendly electronic device 78 is proximate the vehicle 30. Such a feature may be advantageous in decreasing the risk of unknown people adjusting the illumination provided by the light assembly 34 and potentially depleting the battery of the vehicle 30.

The light control routine 80 may further be run with sensor data from the temperature sensor 48. For example, the light control routine 80 may further include a step 182 of detecting a temperature of the light source 40 and a step 186 of illuminating the light source 40 at a third illumination in response to the detection of the light source temperature. The third illumination may be less than or greater than the first and/or second illuminations. Thermal management (e.g., the expulsion or getting rid of heat) of the light source 40 is important in maintaining an even and consistent illumination; however, the maximum operating temperature assumption for the light source 40 (e.g., about 167° F.-221° F. for an LED on a PCB) is not accurate most of the time. As such, by incorporating the temperature sensor 48 to sense the temperature of the light source 40, overdriving of the light source 40 may be achieved, even if in short bursts. For example, if the capacitive sensor detects touch by the user triggering the higher second illumination, the light source 40 may be overdriven by the controller 70 until the temperature sensor 48 detects a critical temperature and rolls back driving of the light source 40 to a lower third illumination which is sustainable. In other words, the controller 70 may be configured to reduce an electrical power to the light source 40 in response to a detected temperature of the light source 40. It will be understood that the third illumination may be greater than the first and/or second illuminations. As such, the light assembly 34 and/or light source 40 may be able to output an increased illumination in the second illumination compared to the first illumination (e.g., two or three times greater) for as long as can be sustained without causing permanent damage to the light source 40.

According to various examples, detection of the location of the electronic device 78 may allow for the light assembly 34 to change where light is projected to using optics and/or by altering which light source 40 is activated. For example, as the electronic device 78 is detected moving away or toward the vehicle 30, the optics may adjust the direction of the light from the light assembly 34 to follow the electronic device 78.

According to various examples, detection of location of the electronic device 78 relative to the vehicle 30 also permits the wireless communication transceivers 150 to determine if an unrecognized electronic device 78 is proximate the vehicle 30. Such an unrecognized electronic device 78 may be owned or carried by a potential burglar or threat to the vehicle 30. In events where an unrecognized electronic device 78 is detected proximate the vehicle 30 for greater than a predetermined time, the wireless communication transceivers 150 and/or controller 70 may activate one or more counter measures. Countermeasures may include a strobe light from the light assembly 34 or directing light from the assembly 34 at the electronic device 78. In some examples, any available identifying information about the electronic device 70 may be stored for later retrieval if the owner of the vehicle's electronic device 78 is not detected proximate the vehicle 30 at the same time.

Use of the presently disclosed vehicle 30 and light assembly 34 may offer a variety of advantages. First, changing the illumination of the light assembly 34, in backup light examples, may provide wide coverage behind the vehicle 30 with bright task lighting which may be advantageous for camp site set-up, work sites, etc. Second, changing the illumination of the light assembly 34, in brake light examples, may provide light for camp sites and other outdoor activities. The benefit of the red light is that it does not attract bugs and preserves night vision. Third, changing the illumination of the light assembly 34, in license plate light examples, may provide a direct stream of light downward in the area of a trailer hitch and the ground directly behind the vehicle 30. Fourth, headlight examples of the light assembly 34, which typically put out large amounts of illumination, may be dimmed to be used as work lights. Fifth, the present disclosure allows a key fob or recent occupant's electronic device to function as an authorization method to control who can control the light assembly 34. Sixth, the light control routine 80 may turn off the light assembly 34 at about 50% battery charge with to protect battery life of the vehicle 30. Seventh, use of the wireless communication transceivers 150 allows for the light assembly 34 to be activated as a person approaches or leaves (e.g., to activate welcome or farewell lighting). Eighth, use of the wireless communication transceivers 150 allows for a low consumption of power from the vehicle 30 while the driver or passengers are away from the vehicle 30. Ninth, use of the photoluminescent structure 10 on the outer lens 38, in conjunction with the conductive circuitry 50 allows a user of the vehicle 30 to tap the light assembly 34 to excite the photoluminescent structure 10. It will be understood that the photoluminescent structure 10 may be excited regardless of whether the light assembly 34 is emitting visible light.

According to various embodiments, a vehicle light assembly includes a light source, a lens positioned proximate the light source, a conductive circuitry disposed on the lens and forming a capacitive sensor, and a temperature sensor configured to detect a temperature of the light source. Embodiments of the vehicle can include any one or a combination of the following features:

the conductive circuitry forming the capacitive sensor also forms a heater;

switching circuitry for selectively switching operation of the conductive circuitry between the capacitive sensor and the heater;

the light assembly forms a vehicle rear taillight;

the conductive circuitry comprises an optically transparent conductive material;

the conductive circuitry comprises a first electrode comprising a first plurality of electrode fingers and a second electrode comprising a second plurality of electrode fingers, and wherein the first plurality of conductive fingers are interdigitated with the second plurality of conductive fingers;

a controller configured to reduce an electrical power to the light source in response to a detected temperature of the light source;

the controller is further configured to increase an illumination provided by the light source in response to activation of the capacitive sensor;

the conductive circuitry comprises at least one electrode that generates a capacitive signal for the capacitive sensor and generates heat for the heater; and/or the heater operates as a resistive heater that generates heat based on electric current.

According to various embodiments, a method of illuminating a vehicle light assembly includes the steps: illuminating a light source at a first illumination; detecting a capacitive signal proximate the light source; and illuminating the light source at a second illumination in response to the detection of the capacitive field. Embodiments of the method can include any one or a combination of the following steps and features:

detecting an electronic device proximate the light assembly;

detection of the electronic device is performed using a Bluetooth low energy detector disposed within the light assembly;

detecting a temperature of the light source;

illuminating the light source at a third illumination in response to the light source temperature;

exciting a photoluminescent structure using the light source; and/or heating the light assembly by passing an electric current through an electric circuitry positioned proximate the light source.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A vehicle light assembly, comprising:
a light source;
a lens positioned proximate the light source;
a conductive circuitry disposed on the lens and forming a capacitive sensor;
a controller configured to increase an illumination provided by the light source in response to activation of the capacitive sensor; and
a temperature sensor configured to detect a temperature of the light source.

2. The vehicle light assembly of claim 1, wherein the conductive circuitry forming the capacitive sensor also forms a heater.

3. The vehicle light assembly of claim 2, further comprising:
switching circuitry for selectively switching operation of the conductive circuitry between the capacitive sensor and the heater.

4. The vehicle light assembly of claim 1, wherein the light assembly forms a vehicle rear taillight.

5. The vehicle light assembly of claim 1, wherein the conductive circuitry comprises an optically transparent conductive material.

6. The vehicle light assembly of claim 1, wherein the conductive circuitry comprises a first electrode comprising a first plurality of electrode fingers and a second electrode comprising a second plurality of electrode fingers, and wherein the first plurality of conductive fingers are inter-digitated with the second plurality of conductive fingers.

7. The vehicle light assembly of claim 1, further comprising:
a controller configured to reduce an electrical power to the light source in response to a detected temperature of the light source.

8. The vehicle light assembly of claim 1, wherein the conductive circuitry comprises at least one electrode that generates a capacitive signal for the capacitive sensor and generates heat for the heater.

9. The vehicle light assembly of claim 7, wherein the controller is further configured to increase an illumination provided by the light source in response to activation of the capacitive sensor.

10. The vehicle light assembly of claim 1, wherein the heater operates as a resistive heater that generates heat based on electric current.

11. A vehicle, comprising:
a vehicle light assembly comprising:
a light source;
a lens positioned proximate the light source; and
a conductive circuitry disposed on the lens and forming a capacitive sensor;
a controller configured to increase an illumination provided by the light source in response to activation of the capacitive sensor; and
one or more wireless communication transceivers configured to detect an electronic device proximate the light assembly.

12. The vehicle of claim 11, further comprising:
a temperature sensor configured to detect a temperature of the light source.

13. The vehicle of claim 12, wherein the controller is further configured to decrease an illumination provided by the light source in response to a signal from the temperature sensor.

14. A method of illuminating a vehicle light assembly, comprising:
illuminating a light source at a first illumination;
detecting a capacitive signal proximate the light source; and
illuminating the light source at a second illumination in response to the detection of the capacitive signal.

15. The method of claim 14, further comprising the step:
detecting an electronic device proximate the light assembly.

16. The method of claim 15, wherein detection of the electronic device is performed using a Bluetooth low energy detector disposed within the light assembly.

17. The method of claim 14, further comprising the steps:
detecting a temperature of the light source; and
illuminating the light source at a third illumination in response to the detection of the light source temperature.

18. The method of claim 14, further comprising the step:
exciting a photoluminescent structure using the light source.

19. The method of claim 14, further comprising the step:
heating the light assembly by passing an electric current through an electric circuitry positioned proximate the light source.

* * * * *